United States Patent
Winter et al.

(10) Patent No.: US 6,821,335 B2
(45) Date of Patent: Nov. 23, 2004

(54) PHTHALIC ACID IMIDES AS SYNERGISTS FOR IMPROVING THE PROPERTIES OF AQUEOUS PIGMENT PREPARATIONS

(75) Inventors: Martin Alexander Winter, Kelkheim (DE); Andreas Harz, Schwalbach (DE); Hans Joachim Metz, Darmstadt (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/415,200

(22) PCT Filed: Oct. 23, 2001

(86) PCT No.: PCT/EP01/12228

§ 371 (c)(1),
(2), (4) Date: Apr. 24, 2003

(87) PCT Pub. No.: WO02/34840

PCT Pub. Date: May 2, 2002

(65) Prior Publication Data

US 2004/0040471 A1 Mar. 4, 2004

(30) Foreign Application Priority Data

Oct. 26, 2000 (DE) .......................................... 100 53 119

(51) Int. Cl.[7] .............................................. C09B 67/00
(52) U.S. Cl. ...................... 106/498; 106/402; 106/413; 106/476; 106/493; 106/494; 106/495; 106/496; 106/497; 106/499; 106/31.78; 430/106; 524/81; 524/86; 524/87; 524/88; 524/89; 524/90; 524/104
(58) Field of Search ................................ 106/402, 413, 106/476, 493, 494, 495, 496, 497, 498, 499; 430/106; 524/81, 86, 87, 88, 89, 90

(56) References Cited

U.S. PATENT DOCUMENTS

| | | | |
|---|---|---|---|
| 3,453,130 A | 7/1969 | Feld | 106/300 |
| 4,478,968 A | 10/1984 | Jaffe | 524/88 |
| 4,992,204 A | 2/1991 | Kluger et al. | 252/301.16 |
| 5,472,494 A | 12/1995 | Hetzenegger et al. | 106/493 |
| 5,554,768 A | 9/1996 | Dönges et al. | 548/545 |
| 5,560,770 A | 10/1996 | Yatake | 106/22 |
| 6,028,192 A | 2/2000 | Becherer et al. | 540/200 |
| 6,039,769 A | 3/2000 | Schultz et al. | 8/574 |

FOREIGN PATENT DOCUMENTS

| | | |
|---|---|---|
| EP | 636666 | 2/1995 |
| EP | 1020496 | 7/2000 |
| GB | 1435247 | 5/1976 |
| WO | WO 02/34840 | 5/2002 |

*Primary Examiner*—Anthony J. Green
(74) *Attorney, Agent, or Firm*—Anthony A. Biscula

(57) ABSTRACT

The invention relates to pigment preparations containing (a) at least one organic or inorganic pigment; (b) at least one cyclic imide of general formula (1) wherein $R^1$ represents a linear-chain, branched or cyclic aliphatic radical having 10 to 30—preferably 12 to 25—carbon atoms, or an alkenyl radical having 10 to 30—preferably 12 to 25—carbon atoms, the aforementioned radicals being able to be substituted by at least one, e.g. 2, 3, 4 or 5, substituent from the group consisting of $C_1$–$C_6$-alkyl, $C_1$–$C_6$-alkoxy, $C_6$–$C_{10}$-aryl, hydroxy, carboxy, and sulfo, $R^2$, $R^3$, $R^4$ and $R^5$ are the same or different and represent hydrogen, $C_1$–$C_{10}$-alkyl, $C_1$–$C_{10}$-alkoxy, halogen, $OR^6$, $NR^6R^7$, —$COOR^6$, —$CONR^6R^7$, —$NR^6$—$COR^7$, $SO_2NR^6R^7$, —$SO_3M$, —$NO_2$, —$CN$ or $CF_3$, $R^6$ and $R^7$ representing H or an alkyl radical having 1 to 10 C atoms and M representing an equivalent of a cation having a valency of 1 to 3; and (c) optionally further standard additives.

12 Claims, No Drawings

PHTHALIC ACID IMIDES AS SYNERGISTS FOR IMPROVING THE PROPERTIES OF AQUEOUS PIGMENT PREPARATIONS

The present invention is situated in the field of aqueous pigment preparations.

In the production of preparations and dispersions of colorants, for example, disperse dyes or organic and inorganic pigments, for applications in aqueous or organic media, a large number of nonionic, anionic, and cationic surfactants is presently in use. The incorporation of pigments or their preparations into coating systems, printing inks, plastics, and other applications is sometimes accompanied by difficulties, since the fine and flocculation-stable dispersion of numerous pigments in the respective application medium is very unsatisfactory and involves a high level of dispersing effort. Consequently, the performance properties are very often inadequate. For instance, during the dispersing operation and thereafter as well, flocculation phenomena and formation of sediment may occur, which lead to changes in the viscosity of the application medium, to changes in shade and to losses in color strength, opacity, gloss, homogeneity, and brightness and also to shades which are difficult to reproduce and to an excessive tendency for paints to run in the case of the materials colored.

For improving the pigment properties a variety of derivatives of pigment molecules are known which are said to enhance the dispersibility. For example, for quinacridone pigments, additives are described which are based on the chemical bonding of isoindole-1,3-diones to this pigment class. One example of this class of compound is the 2-(phthalimido-methyl)quinacridone U.S. Pat. No. 4,478, 968 describes for enhancing the dispersing properties of the quinacridone pigment.

EP-A-0 636 666 describes imide and bisimide derivatives which derive from perylene-3,4,9,10-tetracarboxylic anhydride and are made available by reaction with amines. These imides are suitable for producing pigment preparations.

None of the products described in the cited documents above, however, is capable of decisively enhancing the fluidity and the flocculation stability of pigment dispersions without having a deleterious influence on other parameters, such as color strength, gloss, shade, and dispersibility. One of the disadvantages of the products described in the above-mentioned documents is that the soluble pigment derivatives, which are themselves intensely colored, can lead undesirably to bleeding in binder systems or in plastics and so to the staining of adjacent materials. Moreover, owing to the low solubility of the parent pigments, the preparation of pigment-derived compounds of this kind involves difficult conditions and a high cost. A further disadvantage is the limited application scope, which because of their intrinsic color remains restricted to pigments of the same or similar color.

The present invention was based on the object of providing pigment preparations which are suitable for producing highly fluid, flocculation-resistant, and storage-stable colorant dispersions for exterior and interior coating and are largely free from the disadvantages specified above.

The object stated is surprisingly achieved by adding below-specified nonpigmentary cyclic imides having aliphatic or olefinic carbon chains, which are virtually colorless or only very slightly colored, to organic or inorganic pigments.

The present invention provides pigment preparations comprising a) at least one organic or inorganic pigment;
b) at least one cyclic imide of the general formula (1)

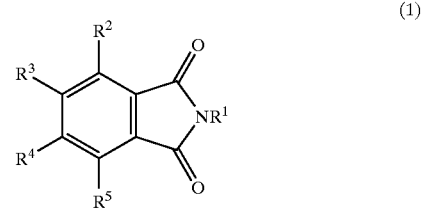

where
$R^1$ [lacuna] for a straight-chain, branched or cyclic aliphatic radical having 10 to 30, preferably 12 to 25, carbon atoms; for an alkenyl radical having 10 to 30, preferably 12 to 25, carbon atoms, it being possible for the radicals stated to be substituted by one or more, e.g., 2, 3, 4 or 5, substituents from the group consisting of $C_1$–$C_6$ alkyl, $C_1$–$C_6$ alkoxy, $C_6$–$C_{10}$ aryl, hydroxyl, carboxyl, and sulfo;
$R^2$, $R^3$, $R^4$ and $R^5$ are identical or different and denote hydrogen, $C_1$–$C_{10}$ alkyl, $C_1$–$C_{10}$ alkoxy, halogen, —$OR^6$, —$NR^6R^7$, —$COOR^6$, —$CONR^6R^7$, —$NR^6$—$COR^7$, $SO_2NR^6R^7$, —$SO_3M$, —$NO_2$, —$CN$ or $CF_3$, $R^6$ and $R^7$ standing for H or an alkyl radical having 1 to 10 carbon atoms and M standing for one equivalent of a 1 to 3 valent cation, e.g. hydrogen or alkali metal; and
c) if desired, further customary additives.

Compounds of the formula (1) per se are known. These compounds are described in, for example, U.S. Pat. No. 4,992,204, but are not used together with organic pigments.

U.S. Pat. No. 6,039,769 describes the use of nonpigmentary cyclic imides having short alkyl radicals for perylene pigment preparations.

Preferred imides of the formula (1) are those wherein $R^1$ denotes decyl, dodecyl, tetradecyl, octadecyl, isotridecyl, lauryl, oleyl or stearyl.

Preferred imides of the formula (1) are also those wherein $R^2$, $R^3$, $R^4$, and $R^5$ are identical or different and denote hydrogen, methyl, ethyl, propyl, butyl, methoxy, ethoxy, amino, methylamino, dimethylamino, ethylamino, diethylamino, carboxyl, $COOCH_3$, carboxamide, $CON(CH_3)_2$, sulfonamide, $SO_2N(CH_3)_2$, sulfo, nitro, cyano or $CF_3$.

The compounds of the formula (1) used in the pigment preparations of the invention can be prepared by known methods from the aromatic parent structures, preferably the cyclic anhydrides, by reaction with the corresponding fatty amines. The cyclic anhydrides are either commercially available or can be prepared easily by known methods from the corresponding dicarboxylic acids: for example, by heating and by treatment with strong acids or dehydrogenating reagents. Of the numerous fatty amines and the natural fatty amine mixtures, only the most important will be mentioned here, such as, for example, dodecylamine, tetradecylamine, octadecylamine, isotridecylamine, coconut fatty amine, laurylamine, oleylamine, rapeseed oil fatty amine, stearylamine or tallow fatty amine. In addition to the fatty amines, mention may also be made of resin amines, and the derivatives preparable therefrom. The water formed during the reaction may be removed distillatively with the addition where appropriate of an azeotrope former: for example, a hydrocarbon or chlorohydrocarbon.

Preferably, however, the amide formation is carried out without solvent simply by distillative removal of the water of reaction formed. Owing to the quantitative yields of amide there is no need for further purification or treatment of the product.

Examples of organic pigments in the sense of the invention are monoazo pigments, disazo pigments, disazo condensation pigments, laked azo pigments, triphenylmethane pigments, thioindigo pigments, thiazine indigo pigments, perylene pigments, perinone pigments, anthanthrone pigments, diketopyrrolopyrrole pigments, dioxazine pigments, quinacridone pigments, phthalocyanine pigments, isoindolinone pigments, isoindoline pigments, benzimidazolone pigments, naphthol pigments and quinophthalone pigments, preference being given to anthanthrone pigments, dioxazine pigments, and phthalocyanine pigments, and also acid to alkaline carbon blacks from the group of the furnace blacks or gas blacks.

Examples of suitable inorganic pigments are titanium dioxides, zinc sulfides, iron oxides, chromium oxides, ultramarine, nickel and chromium antimony titanium oxides, cobalt oxides, and bismuth vanadates.

Preferred pigment preparations contain
a) 5 to 60% by weight, especially 10 to 50% by weight, of pigment;
b) 0.1 to 15% by weight, especially 0.5 to 10% by weight, of the imide of the formula (1);
c) 0 to 50% by weight, especially 1 to 30% by weight, of further additives; and
d) 10 to 80% by weight of water, based on the total weight of the pigment preparation.

Examples of further additives are anionic, cationic or nonionic surfactants, foam-reducing agents, agents which prevent the preparation drying out, and preservatives.

Suitable surfactants include all known anionic, cationic, and nonionic surface-active compounds. Surfactants which possess one or more medium- or long-chain hydrocarbon chains have proven themselves particularly. Of the multiplicity of compounds only a selection will be listed at this point, without, however, restricting the applicability of the compounds of the invention to these examples. Examples are alkyl sulfates, alkenyl sulfates, alkylsulfonates, alkenylsulfonates, alkyl phosphates, alkylbenzenesulfonates, such as lauryl sulfate, stearyl sulfate, dodecyl-sulfonates, octadecyl sulfates, dodecylsulfonates; condensation products of fatty acid and taurine or hydroxyethanesulfonic acid, alkoxylation products of alkylphenols, castor oil rosin esters, fatty alcohols, fatty amines, fatty acids, and fatty acid amides, especially reaction products of nonylphenol and relatively short-chain, substituted alkylphenols and also their polymeric derivatives, e.g., formaldehyde condensation products.

The use of surfactants having identical or very similar aliphatic radicals to prepare the pigment dispersions of the invention gives dispersions having particularly good and application-friendly properties.

The present invention also provides a process for producing the pigment preparations of the invention by adding the compound(s) of the formula (1) and, where appropriate, the further additives during the pigment synthesis, or during one of the customary finishing steps such as grinding, dispersing or solvent treatment or else not until during the incorporation of the pigment into the application medium. The compound of the formula (1) can be added in solid or dissolved form to the pigment, which is present as a solid or as a dispersion in water or an organic solvent.

Dispersing and grinding operations take place conventionally in accordance with the hardness of the pigment used: for example, in sawtooth stirrers (dissolvers), rotor-stator mills, turbulent high-speed mixers, ball mills, sand mills or bead mills, in kneading apparatus or on roll mills.

The liquid- to pastelike pigment preparations prepared in this way are available for any purpose for which colorant dispersions are normally employable and for which exacting requirements are imposed on flocculation and/or storage stability, changes in viscosity of the application medium, shade changes, color strength, opacity, gloss, homogeneity, and brightness. Thus they are suitable, for example, for the coloring of natural and synthetic materials. They are particularly valuable, in accordance with the invention, for the preparation of paints and/or printing inks, and also for the coloring of plastics and high molecular mass materials, but preferably for the preparation of pigment dispersions which further comprise one or more surfactants, water, customary amounts of builder substances or other customary additives or auxiliaries which are used in emulsifying and dispersing formulations, such as, for example, additives which delay the formulation drying out. Aqueous dispersions prepared on this basis are outstandingly suitable for pigmenting both hydrophilic and hydrophobic systems.

As well as the preparation of pigment dispersions the compounds of the invention can also be used, preferably in combination with surfactants, to prepare dispersions of dyes, optical brighteners, and also for formulating crop protection and pesticide compositions and additionally as emulsifying, leveling, and dyeing assistants for the dyeing of natural and synthetic fiber materials.

The pigment dispersions of the invention are suitable as colorants in electrophotographic toners and developers, such as one- or two-component powder toners (also called one- or two-component developers), magnetic toners, liquid toners, latex toners, polymerization toners, and specialty toners, for example.

Typical toner binders are addition polymerization, polyaddition and poly-condensation resins, such as styrene, styrene-acrylate, styrene-butadiene, acrylate, polyester, phenolic-epoxy resins, polysulfones, polyurethanes, individually or in combination, and also polyethylene and polypropylene, which may include further ingredients, such as charge control agents, waxes or flow assistants, or may be modified subsequently with these additives.

Furthermore, the pigment dispersions of the invention are suitable as colorants in powders and powder coating materials, especially in triboelectrically or electrokinetically sprayable powder coating materials, which are used to coat the surfaces of articles made, for example, of metal, wood, plastic, glass, ceramic, concrete, textile material, paper or rubber.

Typical powder coating resins used include epoxy resins, carboxyl- and hydroxyl-containing polyester resins, polyurethane resins, and acrylic resins, together with customary curatives. Resin combinations are also employed. For example, epoxy resins are frequently used in combination with carboxyl- and hydroxyl-containing polyester resins. Typical curative components (depending on the resin system) are, for example, acid anhydrides, imidazoles and also dicyandiamide and its derivatives, blocked isocyanates, bisacylurethanes, phenolic resins and melamine resins, triglycidyl isocyanurates, oxazolines, and dicarboxylic acids.

In addition, the pigment dispersions of the invention are suitable as colorants in inks, preferably ink-jet inks, such as those on an aqueous or nonaqueous basis, for example, in microemulsion inks, and in those inks which operate in accordance with the hot-melt process.

Ink-jet inks generally contain in total from 0.5 to 15% by weight, preferably 1.5 to 8% by weight (calculated on a dry basis), of the pigment dispersions of the invention.

Microemulsion inks are based on organic solvents, water, and, where appropriate, an additional hydrotropic substance (interface mediator). Microemulsion inks contain 0.5 to 15% by weight, preferably 1.5 to 8% by weight, of the pigment dispersions of the invention, 5 to 99% by weight of water, and 0.5 to 94.5% by weight of organic solvent and/or hydrotropic compound.

Solvent-based ink-jet inks contain preferably 0.5 to 15% by weight of the pigment dispersions of the invention, 85 to 99.5% by weight of organic solvent and/or hydrotropic compounds.

Hot-melt inks are based generally on waxes, fatty acids, fatty alcohols or sulfonamides which are solid at room temperature and become liquid on heating, the preferred melting range being situated between about 60 and about 140° C. Hot-melt ink-jet inks consist essentially, for example, of 20 to 90% by weight of wax and 1 to 10% by weight of the pigment dispersions of the invention. Furthermore, 0 to 20% by weight of an additional polymer (as "dye dissolver"), 0 to 5% by weight of dispersing auxiliary, 0 to 20% by weight of viscosity modifier, 0 to 20% by weight of plasticizer, 0 to 10% by weight of tack additive, 0 to 10% by weight of transparency stabilizer (prevents, for example, crystallization of the waxes), and 0 to 2% by weight of antioxidant may be present. Typical additives and auxiliaries are described in, for example, U.S. Pat. No. 5,560,760.

Moreover, the pigment dispersions of the invention are also suitable as colorants for color filters, both for additive and for subtractive color generation, and for "electronic inks".

The pigment dispersions prepared in accordance with the invention are miscible with water in any proportion as compared with conventional pigment dispersions feature an outstanding flocculation stability and storage stability in numerous aqueous emulsion paints. Where surfactants compatible with hydrophobic film-forming binder systems are used in preparing the pigment dispersions, it is also possible to prepare dispersions which are stable to flocculation in hydrophobic media. Particularly noteworthy features include the good rheological properties and also the excellent dispersibility in different application media.

The compounds of the invention therefore make it possible, preferably in combination with an appropriate surfactant, to achieve virtually the full color strength and brightness of pigments during the dispersing operation and to stabilize these qualities lastingly in the application medium. Pale and bright shades are unaffected by the minimal intrinsic coloration of the compounds.

In the examples which follow, percentages and parts are by weight.

1. Aqueous Preparation Comprising a Violet Pigment (C.I. Pigment Violet 23)

Preparation A 1.1 Comparative Preparation Without Synergist

In order to evaluate the compounds of the invention, a preparation without synergist is prepared first of all. This preparation is then incorporated by stirring both into a white dispersion and into the varnish system, and used for coloring. These colorations serve as a standard with which the novel preparations are compared.

Ingredients:
20% C.I. Pigment Violet 23
21% mixture of nonionic dispersants (polyphenol/fatty alcohol ethoxylate)
1% mixture of long-chain fatty acids
10% glycerol
10% propylene glycol
0.2% preservative
37.8% demineralized water To produce the pigment preparations, first of all the liquid ingredients are homogenized in a laboratory beadmill in analogy to the formulas set out in the examples. Using a sawtooth disk, the pulverulent pigment is then incorporated and the amount of water chosen here is such as to give a paste which is homogeneous, of relatively high viscosity, and readily stirrable. Subsequently the grinding medium (1 mm siliquartzite beads) is added and the paste is ground for 60 minutes. After the grinding medium has been mixed in initially at the beginning of grinding, the optimum milling viscosity is set appropriately by adding water. After grinding, the grinding medium is separated off by centrifugation.

For suitability testing, this pigment preparation is stirred at a concentration of 1% into a commercially available standard white dispersion, applied as a thin film and then subjected to coloristic evaluation.

Incorporation also takes place into a test varnish in order to assess the varnish compatibility of the pigment preparation. As well as the incorporation of the pigment preparation into the test varnish by stirring with a spatula for about 10 minutes, an analogous sample is prepared by stirred incorporation for about 10 minutes using a dissolver disk. The two samples are compared with one another in terms of color strength. In this comparison, figures close to 100% indicate excellent dispersing and high paint compatibility of the pigment preparation.

In order to test the dispersibility and the flocculation stability in the application medium, a part of the film is subjected to brief initial drying and then rubbed repeatedly under moderate pressure with a brush or with the finger. If the pigment preparation is dispersed unsatisfactorily in the test medium or if flocculation occurred during incorporation of the preparation into the test medium, then the shearing force exerted on the film by rubbing causes at least partial deflocculation or deagglomeration of flocculated or agglomerated pigment particles. The area treated in this way then exhibits either a higher color strength and/or a more irregular or unequal shade in comparison with the unrubbed area. The rubout test is suitable as a simple but usually very sensitive test for assessing with relative ease the quality of the pigment preparation in terms of dispersibility and of flocculation stability. A test of this kind is widely described in the literature; for example, in FARBE & LACKE 100, number 6/2000, 51–61.

To test the storage stability, a sample of the pigment preparation is stored hot at 50–60° C. in a closed vessel for 4 to 5 weeks. The viscosity of the samples is measured both before and after this storage. In the case of the preparation without synergist severe rubout effects were evident; that is, the rubbed area of the colorations exhibits a relatively high color strength and also severe irregularities in shade. Moreover, the preparations thicken both at room temperature and at 50–60° C. within a few days to form a solid mass which can no longer be liquefied even by stirring or shaking and which from a performance standpoint can no longer be utilized as a pigment preparation.

1.2 Preparation with Synergist 1

Preparation of the Synergist 1:

74.06 parts of phthalic anhydride and 133.75 parts of oleylamine are mixed at room temperature and heated at 130° C. for 4 hours under a nitrogen atmosphere with stirring. The water of reaction formed is distilled off continuously.

Production of the Pigment Preparation:

20% C.I. Pigment Violet 23

21% mixture of nonionic dispersants (polyphenol/fatty alcohol ethoxylate)

2% synergist 1

1% mixture of long-chain fatty acids

10% glycerol

10% propylene glycol 0.2% preservative 35.8% demineralized water

The pigment preparation is produced as described in Example 1.1 but with the use of the above formula and of the above-described synergist 1. For suitability testing, 1% of this pigment preparation is stirred into commercially available standard white dispersion, applied as a thin film and then subjected to coloristic evaluation. It was also incorporated into a test varnish in order to assess the varnish compatibility of the pigment preparation. As well as being incorporated into the test varnish by stirring with a spatula for about 10 minutes, an analogous sample of the pigment preparation is prepared by stirred incorporation with a dissolver disk for about 10 minutes. The two samples are compared with one another in terms of color strength (HS dispersion).

In order to test the dispersibility and the flocculation stability in the application medium, a part of the film is subjected to brief initial drying and then rubbed repeatedly under moderate pressure with a brush or with the finger (rubout test).

Results:

| | |
|---|---|
| rel. color strength (matt, 1%): | 107%, dC = 1.36 (III cleaner), dH = −0.32 (II bluer, dE = 1.4 |
| rel. color strength (varnish, 1%): | 103%, dC = −0.32 (II dirtier), dH = −0.49 (II bluer), dE = 0.59 |
| HS dispersion: | 106% |
| Viscosity (fresh): | 911.9 mPas |
| Viscosity (4 weeks/50° C.): | 1554.0 mPas |

The pigment preparation produced in accordance with the invention is found to be stable on storage; that is, despite hot storage at 50° C. for 4 weeks, the sample remained very fluid. The hand stirrer (HS) dispersion of only 106% is evidence of the excellent dispersing and high varnish compatibility of the pigment preparation. In the case of the preparation there were no rubout effects at all; that is, the rubbed area of the colorations has an identical color strength and no irregularities in shade. The testing of this pigment preparation in commercially available standard white dispersion produces not only the distinct color strength gain but also a significantly cleaner shade as compared with the preparation without the synergist of the invention.

1.3 Preparation with Synergist 2

Preparation of the Synergist 2:

As in Example 1.2 from 74.06 parts of phthalic anhydride and 131.0 parts of tallow fatty amine.

Production of the Pigment Preparation:

The pigment preparation is produced as described in Example 1.1 but using the above synergist 2 and the formula given under Example 1.2, and is tested as described above.

Results:

| | | |
|---|---|---|
| rel. color strength (matt, 1%): | 105%, | dC = 1.07 (III cleaner), dH = −0.32 (II bluer), dE = 1.12 |
| rel. color strength (varnish, 1%): | 97%, | dC = −0.46 (II dirtier), dH = −0.40 (II bluer), dE = 0.61 |
| HS dispersion: | 106% | |
| Viscosity (fresh): | 839.6 mPas | |
| Viscosity (4 weeks/50° C.): | 1032.0 mPas | |

The pigment preparation produced in accordance with the invention is found to be outstandingly stable on storage; that is, despite hot storage at 50° C. for 4 weeks, the sample remained very fluid. In the case of the preparation there were no rubout effects at all; that is, the rubbed area of the colorations has an identical color strength and no irregularities in shade. The testing of this pigment preparation in commercially available standard white dispersion produces not only the distinct color strength gain but also a significantly cleaner shade as compared with the preparation without the synergist of the invention.

1.4 Preparation with Synergist 3

Preparation of the Synergist 3:

As in Example 1.2 from 58.5 parts of phthalic anhydride and 106.5 parts of octadecylamine (95% form).

Production of the Pigment Preparation:

The pigment preparation is produced as described in Example 1.1 but using the above synergist 3 and the formula given under Example 1.2, and is tested as described above.

Results:

| | | |
|---|---|---|
| rel. color strength (matt, 1%): | 108%, | dC = 1.35 (III cleaner), dH = −0.30 (II bluer), dE = 1.39 |
| rel. color strength (varnish, 1%): | 96%, | dC = −0.69 (III dirtier), dH = −0.44 (II bluer), dE = 0.82 |
| HS dispersion: | 106% | |
| Viscosity (fresh): | 683.7 mPas | |
| Viscosity (4 weeks/50° C.): | 1034.0 mPas | |

The pigment preparation produced in accordance with the invention is found to be outstandingly stable on storage; that is, despite hot storage at 50° C. for 4 weeks, the sample remained very fluid. In the case of the preparation there were no rubout effects at all; that is, the rubbed area of the colorations has an identical color strength and no irregularities in shade. The testing of this pigment preparation in commercially available standard white dispersion produces not only the distinct color strength gain but also a significantly cleaner shade as compared with the preparation without the synergist of the invention.

2. Aqueous Preparation Comprising C.I. Pigment Violet 23 Preparation B 2.1 Comparative Preparation without Synergist In order to evaluate the compounds of the invention a preparation without synergist is prepared first of all. This preparation is then incorporated by stirring into a white dispersion, and used for coloring. These colorations serve as a standard with which the novel preparations are compared.

Ingredients:

30% C.I. Pigment Violet 23

12% mixture of nonionic dispersants (polyphenol/fatty alcohol ethoxylate)

20.0% propylene glycol 0.2% preservative 37.8% demineralized water

Production and Suitability Testing of the Pigment Preparation as Described Under 1.1.

In the case of the preparation without synergist severe rubout effects were evident; that is, the rubbed area of the colorations exhibits a relatively high color strength and also severe irregularities in shade. Moreover, the preparations thicken both at room temperature and at 50–60° C. within a few days to form a solid mass which can no longer be liquefied even by stirring or shaking and which from a performance standpoint can no longer be utilized as a pigment preparation.

2.2 Preparation with Synergist 2

Preparation of the Synergist 2:

As in Example 1.2 from 74.06 parts of phthalic anhydride and 133.75 parts of oleylamine.

Ingredients of the Pigment Preparation:

30% C.I. Pigment Violet 23

12% mixture of nonionic dispersants (polyphenol/fatty alcohol ethoxylate)

4% synergist 2

20.0% propylene glycol 0.2% preservative 33.8% demineralized water

Results:

| | |
|---|---|
| rel. color strength (matt, 1%): | 101%, dC = 0.43 (II cleaner), dH = −0.12 (I bluer), dE = 0.45 |
| Viscosity (fresh): | 762.1 mPas |
| Viscosity (4 weeks/50° C.): | 800.0 mPas |

The pigment preparation produced in accordance with the invention is found to be outstandingly stable on storage; that is, despite hot storage at 50° C. for 4 weeks, the sample remained very fluid. In the case of the preparation there were no rubout effects at all; that is, the rubbed area of the colorations has an identical color strength and no irregularities in shade. The testing of this pigment preparation in commercially available standard white dispersion also produces a significantly cleaner shade as compared with the preparation without the synergist of the invention.

The synergist of the invention also improves the grinding characteristics positively. Whereas without synergist the temperature of the pigment preparation during grinding should not rise substantially above 25° C. in order to prevent thickening, the preparation with synergist can be ground at 60° C. until the target color strength is reached. No substantial deterioration is observed in the coloristic data as compared with grinding at 25° C.

3. Aqueous Preparation Comprising a Red Pigment (C.I. Pigment Red 168)

3.1 Comparative Preparation without Synergist

In order to evaluate the compounds of the invention a preparation without synergist is prepared first of all. This preparation is then incorporated by stirring into a white dispersion, and used for coloring. These colorations serve as a standard with which the novel preparations are compared.

Ingredients:

35% C.I. Pigment Red 168

10% mixture of nonionic dispersants (fatty alcohol ethoxylates)

10.0% propylene glycol 10.0% diethylene glycol 0.2% preservative 34.8% demineralized water Production and Suitability Testing of the Pigment Preparation as Described Under 1.1.

In the case of the preparation without synergist severe rubout effects were evident; that is, the rubbed area of the colorations exhibits a relatively high color strength and also severe irregularities in shade. Moreover, the preparations thicken both at room temperature and at 50–60° C. within a few days to form a solid mass which can no longer be liquefied even by stirring or shaking and which from a performance standpoint can no longer be utilized as a pigment preparation.

3.2 Preparation with Synergist 2

Preparation of the Synergist 2:

As in Example 1.2 from 74.06 parts of phthalic anhydride and 133.75 parts of oleylamine.

Ingredients of the Pigment Preparation:

35% C.I. Pigment Red 168

10% mixture of nonionic dispersants (fatty alcohol ethoxylates)

4% synergist 10.0% propylene glycol 10.0% diethylene glycol 0.2% preservative 30.8% demineralized water Results:

| | |
|---|---|
| rel. color strength (matt, 3%): | 105%, dC = 0.58 (II cleaner), dH = 0.41 (II yellower), dE = 0.76 |
| rel. color strength (varnish, 3%): | 100%, dC = 0.15 (I cleaner), dH = −0.04 (I = I), dE = 0.16 |
| Viscosity (fresh): | 209.0 mPas |
| Viscosity (4 weeks/50° C.): | 316.7 mPas |

The pigment preparation produced in accordance with the invention is found to be outstandingly stable on storage; that is, despite hot storage at 50° C. for 4 weeks, the sample remained very fluid. In the testing of the preparations (3% form, white dispersion, and varnish) there were no rubout effects at all; that is, the rubbed area of the colorations has an identical color strength and no irregularities in shade. The testing of this pigment preparation in commercially available standard white dispersion and in the varnish system also produces a significantly cleaner shade as compared with the preparation without the synergist of the invention. The synergist of the invention also improves the grinding characteristics positively. Whereas without synergist the temperature of the pigment preparation during grinding should not rise substantially above 25° C. in order to prevent thickening, the preparation with synergist can be ground at 60° C. until the target color strength is reached. No substantial deterioration is observed in the coloristic data as compared with grinding at 25° C.

4. Aqueous Preparation Comprising a Green Pigment (C.I. Pigment Green 7)

4.1 Comparative Preparation without Synergist

In order to evaluate the compounds of the invention a preparation without synergist is prepared first of all. This preparation is then incorporated by stirring into a white dispersion, and used for coloring. These colorations serve as a standard with which the novel preparations are compared.

Ingredients:

45% C.I. Pigment Green 7

8% mixture of nonionic dispersants (fatty alcohol ethoxylates)

19.0% diethylene glycol 0.2% preservative 27.8% demineralized water

Production and Suitability Testing of the Pigment Preparation as Described Under 1.1.

In the case of the preparation without synergist severe rubout effects were evident; that is, the rubbed area of the colorations exhibits a relatively high color strength and also severe irregularities in shade. Moreover, the preparations thicken both at room temperature and at 50–60° C. within a few days to form a solid mass which can no longer be liquefied even by stirring or shaking and which from a performance standpoint can no longer be utilized as a pigment preparation.

4.2 Preparation with Synergist 2

Preparation of the Synergist 2:

As in Example 1.2 from 74.06 parts of phthalic anhydride and 133.75 parts of oleylamine.

Ingredients:

45% C.I. Pigment Green 7

8% mixture of nonionic dispersants (fatty alcohol ethoxylates)

3% synergist 19.0% diethylene glycol 0.2% preservative 24.8% demineralized water Results:

| | |
|---|---|
| rel. color strength (matt, 1%): | 105%, dC = −0.33 (II dirtier), dH = 0.41 (II bluer), dE = 0.54 |
| rel. color strength (varnish, 1%): | 105%, dC = 0.22 (I cleaner), dH = −0.07 (I = I), dE = 0.24 |
| Viscosity (fresh): | 305.5 mPas |
| Viscosity (4 weeks/50° C.): | 712.1 mPas |

The pigment preparation produced in accordance with the invention is found to be outstandingly stable on storage; that is, despite hot storage at 50° C. for 4 weeks, the sample remained very fluid. In the testing of the preparations (1% form, white dispersion, and varnish) there were no rubout effects at all; that is, the rubbed area of the colorations has an identical color strength and no irregularities in shade. The testing of this pigment preparation in a commercially available varnish system also produces a cleaner shade as compared with the preparation without the synergist of the invention. The synergist of the invention also improves the grinding characteristics positively. Whereas without synergist the temperature of the pigment preparation during grinding should not rise substantially above 25° C. in order to prevent thickening, the preparation with synergist can be ground at 60° C. until the target color strength is reached. No substantial deterioration is observed in the coloristic data as compared with grinding at 25° C.

What is claimed is:
1. A pigment preparation comprising
   a) at least one organic or inorganic pigment;
   b) at least one cyclic imide of the general formula (1)

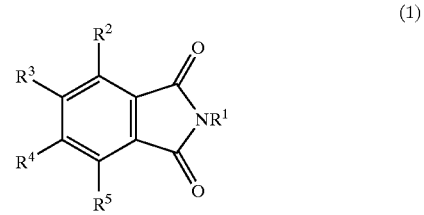

where
   $R^1$ stands for a straight-chain, branched or cyclic aliphatic radical having 10 to 30 carbon atoms; for an alkenyl radical having 10 to 30 carbon atoms, it being possible for the radicals stated to be substituted by one or more substituents from the group consisting of $C_1$–$C_6$ alkyl;
   $R^2$, $R^3$, $R^4$ and $R^5$ are identical or different and denote hydrogen, $C_1$–$C_{10}$ alkyl, $C_1$–$C_{10}$ alkoxy, halogen, —$OR^6$, —$NR^6R^7$, —$COOR^6$, —$CONR^6R^7$, —$NR^6$—$COR^7$, $SO_2NR^6R^7$, —$SO_3M$, —$NO_2$, —$CN$ or $CF_3$, $R^6$ and $R^7$ standing for H or an alkyl radical having 1 to 10 carbon atoms and M standing for one equivalent of a 1 to 3 valent cation.

2. The pigment preparation of claim 1, wherein $R^1$ is selected from the group consisting of decyl, dodecyl, tetradecyl, octadecyl, isotridecyl, lauryl, oleyl or stearyl.

3. The pigment preparation of claim 1, wherein $R^2$, $R^3$, $R^4$ and $R^5$ are identical or different and are selected from the group consisting of hydrogen, methyl, ethyl, propyl, butyl, methoxy, ethoxy, amino, methylamino, dimethylamino, ethylamino, diethylamino, carboxyl, $COOCH_3$, carboxamide, $CON(CH_3)_2$, sulfonamide, $SO_2N(CH_3)_2$, sulfo, nitro, cyano or $CF_3$.

4. The pigment preparation of claim 1, wherein the at least one organic or inorganic pigment is at least one organic pigment and the at least one organic pigment is a monoazo pigment, disazo pigment, disazo condensation pigment, laked azo pigment, triphenylmethane pigment, thioindigo pigment, thiazine indigo pigment, perylene pigment, perinone pigment, anthanthrone pigment, diketopyrrolopyrrole pigment, dioxazine pigment, quinacridone pigment, phthalocyanine pigment, isoindolinone pigment, isoindoline pigment, benzimidazolone pigment, naphthol pigment quinophthalone pigment, or carbon black.

5. The pigment preparation of claim 1, further comprising at least one additive.

6. The pigment preparation of claim 5, further comprising water, and wherein the at least one organic or inorganic pigment is present in an amount of 10 to 50% by weight, the at least one cyclic imide of formula (1) is present in the amount of 0.5 to 10% by weight, the at least one additive is present in the amount of 1 to 30% by weight and the water is present in the amount of 10 to 80% by weight.

7. The pigment preparation of claim 5, further comprising water, and wherein the at least one organic or inorganic pigment is present in an amount of 5 to 60% by weight, the at least one cyclic imide of the formula (1) is present in the amount of 0.1 to 15% by weight, the at least one additive is present in the amount of 0 to 50% by weight and the water is present in the amount of 10 to 80% based on the total weight of the pigment preparation.

8. The pigment preparation of claim 5, wherein the at least one additive is an anionic, catlonic or nonionic surfactant.

9. The pigment preparation of claim 8, wherein the surfactent is a compound selected from the group consisting of alkyl sulfates, alkenyl sulfates, alkylsulfonates, alkenylsulfonates, alkyl phosphates, alkylbenzenesulfonates; condensation products of fatty acid and taurine or hydroxyethanesulfonic acid; alkoxylation products of alkylphenols, castor oil rosin esters, fatty alcohols, fatty amines, fatty acids, and fatty acid amides.

10. A process for preparing a pigment preparation of claim 1 comprising the step of adding the at least one cyclic amide of the formula (1) to the at least one organic or inorganic pigment during synthesis, grinding, dispersing and/or finishing of the organic or inorganic pigment.

11. A colorant comprising the pigment preparation of claim 1, wherein the colorant is used in a product selected from the group consisting of paints, varnishes, printing inks, electrophotographic toners and developers, powder coating materials, inks, and plastics.

12. A product comprising the pigment preparation of claim 1, wherein the product is selected from the group consisting of paints, varnishes, printing inks, electrophotographic toners and developers, powder coating materials, inks, and plastics.

* * * * *